Patented Mar. 28, 1950

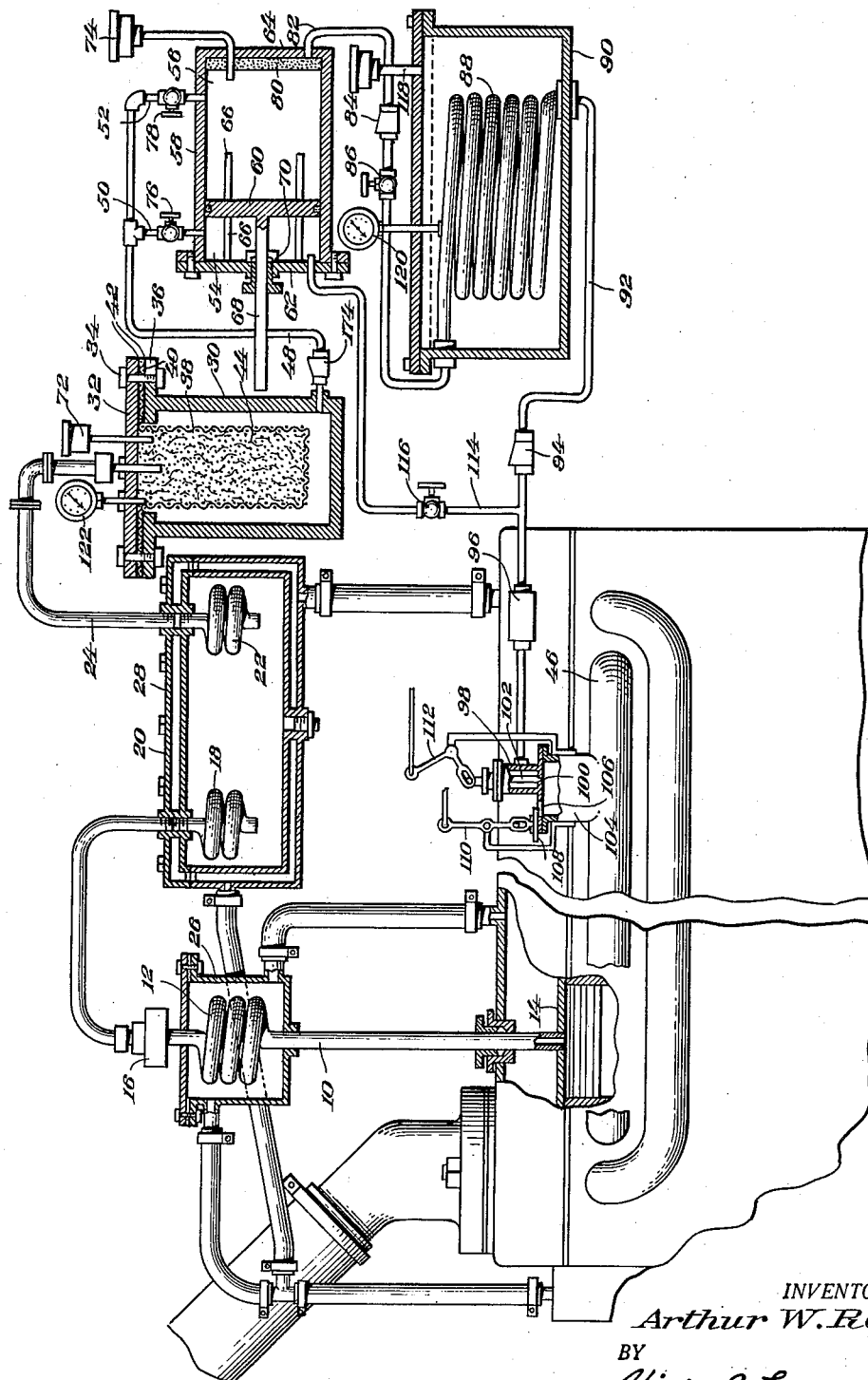

2,501,739

UNITED STATES PATENT OFFICE 2,501,739

INTERNAL-COMBUSTION ENGINE FUEL SYSTEM AND COOLING MEANS

Arthur W. Reed, Detroit, Mich.

Application October 2, 1943, Serial No. 504,764

4 Claims. (Cl. 62—169)

My invention relates to internal combustion engines, and has among its objects and advantages the provision of a novel fuel vaporizing system so designed as to deliver the fuel to the intake manifold of the engine under pressure without the aid of conventional fuel pumps and carburetors.

The drawing schematically illustrates the fuel system in section.

The present invention is applicable to an exhaust gas pressure system such as that disclosed in my patent on Apparatus for destroying acid flame in internal combustion motor gases, No. 2,256,950, issued September 23, 1941.

In the foregoing patent, a tube 10 is bent to provide a coil 12 and has communication with the engine cylinder 14. A gas take-off device 16 has communication with the coil 12, the device 16 being connected with a coil 18 in an expansion chamber 20. The passage in the tube 10 is of relatively small diameter so as to extinguish the flame of gases flowing therethrough. A second coil 22 is arranged inside the expansion chamber 20 and is connected with a pressure take-off tube 24.

A water jacket 26 extends about the coil 12 and a water jacket 28 is incorporated in the wall structure of the expansion chamber 20, both water jackets being connected into the water cooling system of the engine. The small diameter of the tube 10 frictionally extinguishes any flames in the burning gases so as to separate flame from pressure to the end that flameless gases under pressure may be accumulated in the expansion chamber 20. The expansion chamber is water cooled to render the gases under pressure fit for use. The structure so far described is in accordance with that illustrated and described in the foregoing patent.

The present invention comprises a fuel tank 30 provided with a cover 32 secured thereto by bolts 34 passing through openings in the cover and a flange 36 on the tank 30. Inside the tank 30 and spaced from its side and bottom walls is a strainer screen 38 provided with a flange 40 interposed between the cover 32 and the flange 36. Gaskets 42 are positioned on opposite sides of the screen flange 40 to provide a fuel and pressure pipe connection. The thickness of the screen is such as not to prevent the gaskets from establishing a good joint. Suitable filtering material 44 is contained in the strainer 40.

The tube 24 has communication with the fuel tank 30 inside the strainer 38 to deliver exhaust gases under pressure into the fuel tank to place the fuel under the necessary delivery pressure with respect to the intake manifold 46 of the engine. A fuel pipe 48 communicates with the tank 30 at its bottom and is provided with branches 50 and 52 leading into chambers 54 and 56 in a cylinder 58, the cylinder being divided into the chambers 54 and 56 by reason of a piston 60 slidable therein. In either extreme position of the piston 60, the piston is spaced some distance from the respective end walls 62 and 64 of the cylinder 58 by reason of stop pins 66 attached to the piston.

A piston position indicating stem 68 is attached to the piston and extends to a position exteriorly of the cylinder 58 through a packing gland 70. The stem 68 projects exteriorly of the cylinder in all positions of the piston.

The fuel tank 30 is provided with a filler tube 72 and the cylinder 58 is provided with a filler tube 74 to supply fuel to the chamber 56, this chamber being filled completely full when the piston 60 is positioned as shown. Valves 76 and 78 are respectively interposed in the branches 50 and 52. Adjacent the end wall 64 is arranged a fuel filter 80, and a fuel line 82 has communication with the cylinder 58 near its bottom side, which fuel line is provided with a check valve 84, a reducing valve 86, in addition to its connection with a refrigerating coil 88 in a chamber 90 which may be supplied with water to be cooled for refrigeration purposes. The other end of the coil 88 connects with a fuel line 92 provided with a check valve 94 and a filtering gland 96. This fuel line communicates with a chamber 98 having a port 100 controlled by a needle valve 102 for feeding fuel in the nature of a spray into the intake manifold 46. The chamber 98 is mounted on a chamber 104 communicating with the intake manifold 46, the chamber 104 being provided with an air inlet opening 106 which may be variably uncovered through the medium of a slide valve 108 actuated through the medium of a lever system 110. The needle valve 102 is controlled through the medium of a lever system 112. The fuel is sprayed into the chamber 104 and is caused to mix with air entering therein through the opening 106, the air and fuel then entering the manifold 46.

To the fuel line 92, between the check valve 94 and the filtering gland 96, is connected a fuel line 114 provided with a valve 116 and having communication with the chamber 54 of the cylinder 58 near the bottom of the cylinder.

A filler tube 118 communicates with the chamber 90, and a pressure gage 120 is tapped into the coil 88. A pressure gage 122 is provided for the fuel tank 30. A check valve 174 is interposed in the fuel line 48.

The present invention provides means for utilizing the pressure and exhaust gases for placing the fuel under such pressure as to eliminate the necessity of the usual fuel pumps. In addition, the fuel system eliminates the necessity of conventional carburetors, and the fuel and air may be effectively controlled and mixed in proper proportions through the medium of the needle valve 102 and the slide valve 108.

In operation, the fuel tank 30 and the chamber 56 are filled with fuel. The valves 78 and 116 are closed and the valve 76 opened with valve 86 partially opened and its opening varied for reasons to be explained. Fuel from the tank 30 will then flow into the chamber 54 under pressure and move the piston 60 for placing fuel under pressure in the fuel line 82 up to the valve 86. The valve 86 is operated as a reducing valve to lower the pressure of the fuel from chamber 56 to that usable and desirable in fuel line 92. The opening of valve 86 is manually adjusted in its customary manner to secure the desired decrease in pressure in the fuel prior to introducing it into the chamber 98. The pressure of the fuel as it leaves chamber 56 for the fuel line 82 is too high for direct introduction into the chamber 98. Hence, the opening of valve 86 is varied by the operator to obtain the desired results. The liquid fuel in passing through the reducing valve 86 will expand due to the decrease in pressure in coils 88, this expansion causing a cooling effect on the coils 88. In view of the area of the piston 60, the fuel in the line 82 will be under considerable pressure. This pressure, acting on the gasoline, reduces the temperature of the coil 88 to a relatively low degree.

After the piston 60 has advanced its full distance with respect to the chamber 56, the chamber 54 will be completely filled with fuel. The valves 76 and 86 are then closed and the valves 78 and 116 opened. The fuel tank 30 will then be in pressure connection with the chamber 56 for advancing the piston 60 in such manner as to force the fuel in the chamber 54 through the pipe 114 and into the end of the line 92 delivering fuel to the needle valve.

This system operates efficiently with a fuel comprising 50% of gasoline and 50% of unrefined crude oil.

Without further elaboration, the foregoing will so fully illustrate my invention, that others may, by applying current knowledge, readily adapt the same for use under various conditions of service.

I claim:

1. A device of the character described comprising a fuel tank, a strainer screen within said tank, having a flange for connecting said screen in said tank and spaced from the side and bottom walls thereof, filtering material within said screen, means for delivering exhaust gases to said tank, a fuel pipe connected to said tank, and having branches connected to a cylinder having a movable piston therein means connecting said cylinder with a refrigerating coil and means connecting to said refrigerating coil with the intake manifold of an internal combustion engine.

2. The invention as in claim 1, wherein said fuel tank is provided with means for supplying fuel thereto.

3. The invention as in claim 1, wherein said refrigerating coil is positioned in a chamber to which water may be supplied to be cooled.

4. In a fuel feeder for internal combustion engines having intake and exhaust manifolds, the combination which comprises a fuel tank, a tubular screen having filtering material therein suspended in said fuel tank, a connection from the interior of said screen to the exhaust manifold of the engine, said connection having a water cooled expansion chamber therein, a pressure cylinder, a piston in said pressure cylinder having a piston rod extended from one end of the cylinder, connections from the fuel tank to opposite ends of the cylinder, a refrigerating coil in an enclosed chamber, a connection from one end of the cylinder to the refrigerating coil, a fuel connection from the said refrigerating coil to the intake manifold of the engine, a connection from the end of the cylinder opposite to the end to which the refrigerating coil is connected extended to the connection from the refrigerating coil to the intake manifold, a needle valve in the connection from the refrigerating coil to the intake manifold, adjustable means admitting air to the intake manifold through the said connection, fuel supply connections to the said fuel tank and cylinder, and valves in the connections between the fuel tank, cylinder, and refrigerating coil, and between the said elements and the intake and exhaust manifolds of the engine.

ARTHUR W. REED.

REFERENCES CITED

The following references are of record in the file of this patent:

UNITED STATES PATENTS

| Number | Name | Date |
|---|---|---|
| 992,505 | Huff | May 16, 1911 |
| 1,296,115 | Pfeifer | Mar. 4, 1919 |
| 1,362,394 | Church | Dec. 14, 1920 |
| 1,437,283 | Twombly | Nov. 28, 1922 |
| 2,195,387 | Schlumbohm | Mar. 26, 1940 |
| 2,256,950 | Reed | Sept. 23, 1941 |

FOREIGN PATENTS

| Number | Country | Date |
|---|---|---|
| 101,251 | Switzerland | 1922 |